United States Patent [19]

Hsu

[11] Patent Number: 4,644,751

[45] Date of Patent: Feb. 24, 1987

[54] INTEGRATED FUEL-CELL/STEAM PLANT FOR ELECTRICAL GENERATION

[75] Inventor: Michael S. Hsu, Lincoln, Mass.

[73] Assignee: Massachusetts Institute of Technology, Cambridge, Mass.

[21] Appl. No.: 711,900

[22] Filed: Mar. 14, 1985

[51] Int. Cl.$^4$ ............................................. F01K 27/00
[52] U.S. Cl. ........................................ 60/676; 60/721; 122/21
[58] Field of Search .................... 60/670, 676, 721; 122/21

[56] References Cited

U.S. PATENT DOCUMENTS 4,087,976  5/1978  Morrow, Jr. et al. ............ 60/721 X Primary Examiner—Allen M. Ostrager
Attorney, Agent, or Firm—Paul J. Cook

[57] ABSTRACT

An electrical generating plant of high efficiency utilizes a conventional steam plant powered by a fossil fuel such as coal, gas or oil, in internal integration with a high temperature solid-oxide fuel-cell. In one embodiment, the spent fuel and the wast heat from the fuel-cell of electrochemical action is made directly available to the combustion furnace of the steam plant for thermodynamic extraction. The system can achieve efficiencies up to 65% compared to ordinary steam plants which have an efficiency of about 35%.

9 Claims, 8 Drawing Figures

INTEGRATED FUEL-CELL/STEAM PLANT FOR ELECTRICAL GENERATION

BACKGROUND OF THE INVENTION

This invention relates to electrical generating plants and more particularly to such plants or facilities having increased efficiency.

The maximum practical efficiency of central steam power plants which burn fossil fuels such as coal, oil or gas to produce electricity is about 35%. The high cost and inefficient use of the fuel contributes to pollution of the atmosphere and the high cost of electricity. It would be desirable to provide an electrical generating plant which produced electricity at high efficiency coupled with low pollution. Efficiencies of up to 50% have been proposed using various thermodynamic topping devices such as high-temperature gas turbines and combustion magnetohydrodynamic generators.

SUMMARY OF THE INVENTION

It is an object of the invention to reduce the pollution caused by fossil fueled power plants.

It is yet another object of the invention to increase the efficiency of power plants.

It is still another object of the invention to accomplish these objectives in existing power plants as well as in new construction.

These objects are accomplished, in one aspect of the invention, by the provision of an electrical generating facility comprised of a fossil fuel fired, steam power plant which includes a boiler having a combustion furnace and a fuel-cell integration in operative relation to the boiler. A supply of fossil fuel is provided and is connected to the fuel-cell for introduction thereinto thereby to commence an electrochemical reaction which generates electricity. Further means are provided for internal integration of the fuel-cell to the combustion furnace whereby the partially spent fuel and surplus heat exiting from the fuel-cell is directed to the combustion chamber for operating the same.

The above-described generating facility can operate with efficiencies of 50-65% and produce less pollution since the fossil fuel is utilized twice, first by electrochemical action and second by thermodynamic extraction.

DESCRIPTION OF THE PREFERRED EMBODIMENTS

For a better understanding of the present invention, together with other and further objects, advantages and capabilities thereof, reference is made to the following description and appended claims taken in conjunction with the above-described drawings.

Figure 1:
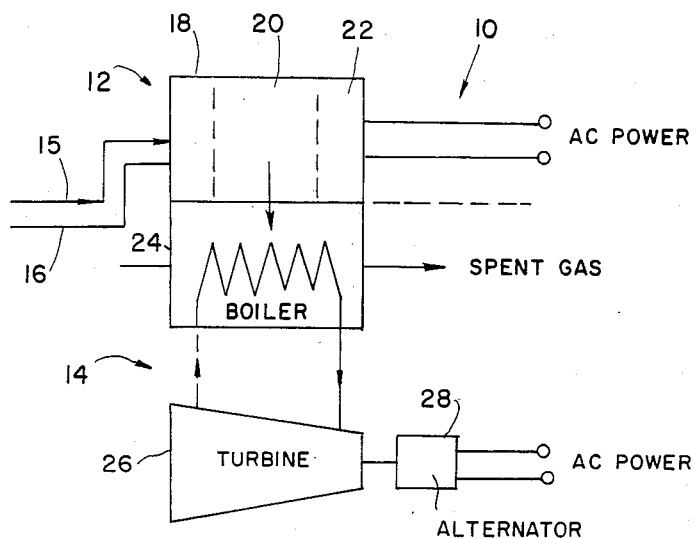
FIG. 1 is a diagrammatic view of an embodiment of the invention.

Referring now to the drawings with greater particularity, there is shown in FIG. 1 an integrated power plant 10 combining a fuel-cell plant 12 and a steam boiler plant 14. Air through conduit 15 and fuel through conduit 16 are fed via fuel conditioner 18 to a high temperature fuel-cell 20. When the fuel is gas, a reformer (18) is used. When the fuel is oil, a reactor (18) is used. When the fuel is coal, a gasifier (18) is used. As used herein, a high temperature fuel-cell is one which operates at a minimum temperature of 700° C. Examples of such cells include solid oxide fuel-cells which operate between 800° C. and 1200° C., and molten carbonate fuel-cells which operate at about 700° C. In a preferred embodiment of the invention, the fuel-cell is a solid oxide zirconia fuel-cell of the type disclosed in U.S. Pat. No. 4,490,445, which is incorporated herein by reference.

The D.C. output of the fuel-cell is fed through an inverter 22 to output A.C. The partially spent fuel and surplus heat exiting from the fuel-cell 20 is directly fed to the combustion furnace of a boiler 24 to be further utilized therein. The steam output of the boiler is fed to a turbine 26 whose output is fed to an alternator 28 for generating A.C. power. The partially spent fuel entering the furnace entrains not only its residue heating value but also the wasted heat discarded from the fuel-cell due to the cells' exothermic reaction and dissipation losses.

Generally, the efficiency of the integrated system can be presented by the following formula: 31

$$n_c = n_{fc} + (1 - n_{fc})n_s$$

or $$n_c = n_s + (1 - n_s)n_{fc}$$

where
  $n_{fc}$ = Fuel-cell plant efficiency
  $n_s$ = Steam power plant efficiency and
  $n_c$ = integrated cycle efficiency.

For example, if $n = 0.30$ and $n_{fc} = 0.55$, an integrated cycle efficiency, $n_c = 0.65$, can be obtained.

Figure 2:
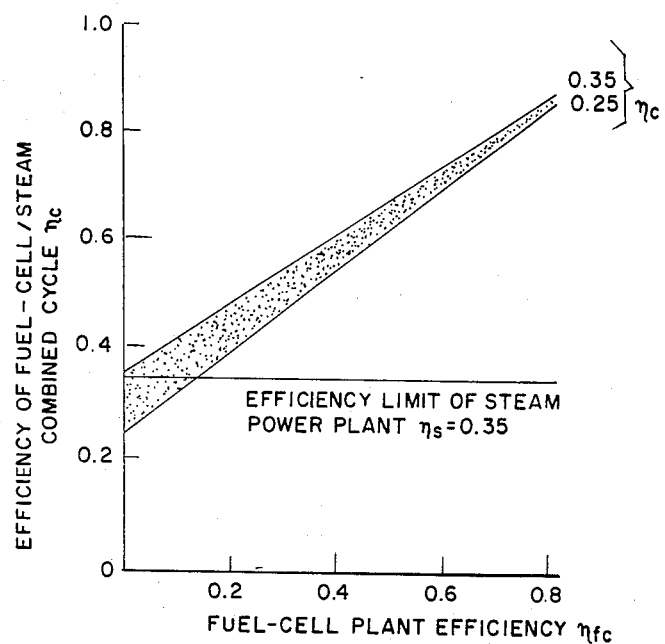
FIG. 2 is a graph of relative efficiencies.

The increased efficiency of this integrated system is shown in the graph of FIG. 2.

Figure 3:
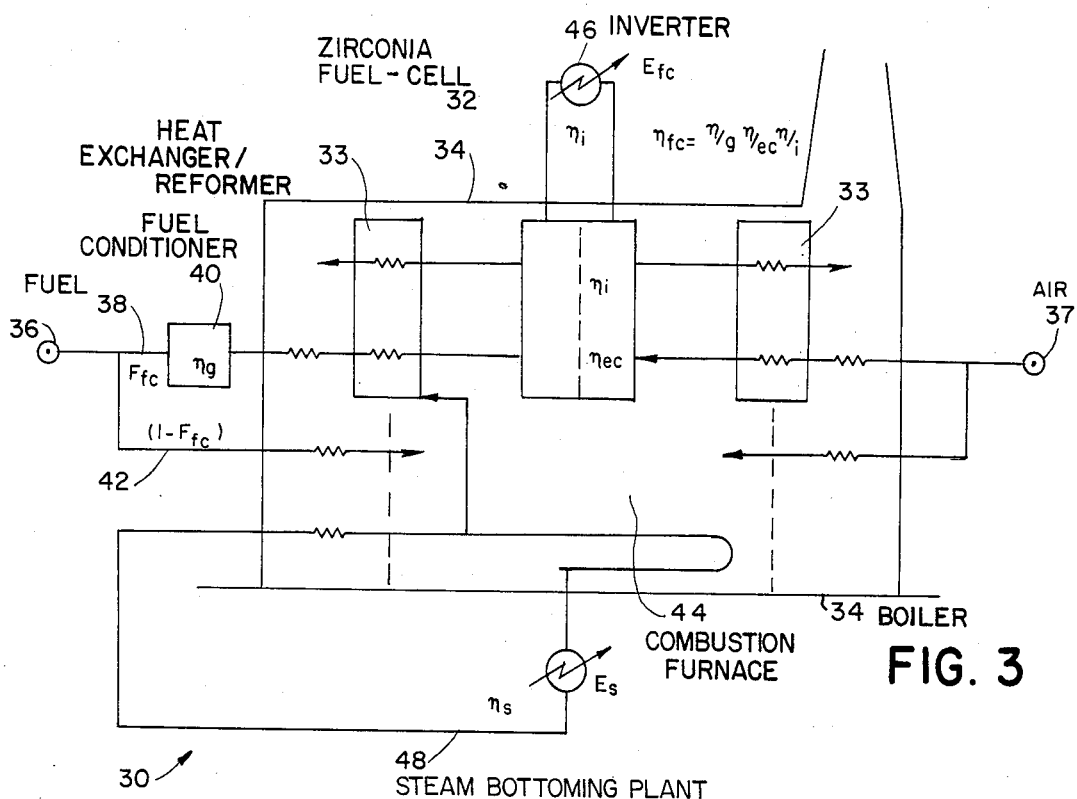
FIG. 3 is a diagrammatic view of an alternate embodiment of the invention.

The integrated power generating facilities can be employed also in retrofitting existing steam power plants, as is shown in FIG. 3. Therein, the power generating plant 30 comprises a fuel-cell 32 and heat exchanger/reformer 33 mounted within the hot zone of a boiler 34. A fuel supply 36 is divided and feeds a portion 38 to an external fuel conditioner 40 and a portion 42 to the combustion furnace 44 of boiler 34. An air supply 37 is also provided. The heat generated in the fuel-cell 32 due to its exothermic reaction and electrochemical inefficiencies is dumped to the combustion gas stream in the boiler for subsequent steam generation. As in the embodiment of FIG. 1, the D.C. current from the fuel-cell 32 is passed to an inverter 46 for conversion to A.C. The boiler steam is fed to a steam plant 48 and the electricity generated thereby added to that from the fuel-cell.

The efficiency of the system can be expressed as:

$$n_c \approx n_s + (1-n_s)n_{fc}F_{fc}$$

where $F_{fc}$ is the fraction of fuel introduced to the fuel-cell and $n_{fc}=n_g n_{ec} n_i$, the overall efficiency of the fuel-cell plant which comprises the conditioner 40 ($n_g$), the fuel-cell 32 ($n_{ec}$) and the inverter 46 ($n_i$). The goal in retrofitting the fuel-cell 32 into the system is to maintain the steam-cycle efficiency, $n_s$, at the present level. To achieve this goal, the contribution provided by the fuel-cell 32, as described by the second term on the right side of the equation, must be positive at any value of $n_{fc}$ and $F_{fc}$ and thus, represents a net gain in efficiency over that of conventional steam power plants. The magnitude of the gain depends on the efficiency and capacity fraction of the fuel-cell.

It will thus be seen that there is provided a power generating plant with many advantages over the prior art. It is more efficient. It produces less air pollution than conventional plants because the fossil fuel is utilized twice, first by electrochemical action, second by thermodynamic extraction.

While there have been shown what are at present considered to be the preferred embodiments of the invention, it will be apparent to those skilled in the art that various changes and modifications can be made herein without departing from the scope of the invention as defined by the appended claims.

Referring to FIGS. 4 through 8, a suitable basic cell unit in the electrochemical fuel cell stack as described in detail in U.S. Pat. No. 4,490,445. The cell unit comprises single electrolyte plate 1, and single conductor plate 2. The electrolyte plate 1 is made of stabilized zirconia $ZrO_2 \cdot (Y_2O_3)$, component 3, on which porous oxidizer electrode 4 and porous fuel electrode 5 are coated. Preferred materials for oxidizer electrodes are perovskites such as $LaMnO_3(Sr)$. Preferred materials for fuel electrodes are cermets such as $ZrO_2/Ni$. The conductor plate 2 is made of metal such as Inconel, or cermets such as $ZrO_2/Ni$. It serves as: electrical connection between adjacent electrolyte plates 1; gas partitions to achieve unipolar stack; and heat conduction path between electrode surfaces 4, 5 and the edge of the plates 1, 2.

Fuel supply is fed to the stacked cell unit through axial (with respect to the stack) manifold 17 provided by holes 13 and its product is exhausted through manifold 18 provided by holes 14. Fuel is distributed over the fuel electrode surface 5 through in plane groove network 6 formed in the upper surface of the conductor plate 2. Notches 8 made in ridges 7 provide openings connecting manifold 17, 18 through holes 13, 14 to fuel electrode 5. Oxidizer supply is fed to the stacked cell unit through manifold 19 provided by holes 15 and its product is exhausted through manifold 20 provided by holes 16. Oxidizer is distributed over the oxidizer electrode surface 4 through in plane groove network 9 formed in the lower surface of the conductor plate 2 of the adjacent cell unit. Notches 11 similar to notches 8 in ridges 10 similar to ridge 7 provide openings connecting manifolds 19, 20 through holes 15, 16 to oxidizer electrode 4. The ridges 7 and 10 forming side walls of the groove networks 6 and 9 on the conductor plates 2 are brought in contact with electrolyte plates 1 in stack assembly. The ridges 7 and 10 are pressed against the porous electrode 5 and the electrode 4 of the adjacent cell unit, respectively in assembly to achieve electrical contacts. The ridges at the outer edge of the conductor plates 2, the ridges along the edge of bolt holes 12, the ridges along the edge of the upper surface of the conductor plates 2 around the holes 15, 16 and the ridges of the lower surface of the conductor plates 2 around the holes 13, 14 are brought in contact with surface coating which has identical structure as the electrode coatings. These circumferential ridges which are not notched are pressed against the electrode coating 4, 5 in assembly to achieve gas seals. Watercooled tension rods (not shown) which are concealed in bolt holes 12 are used to provide the assembly force.

Figure 7:
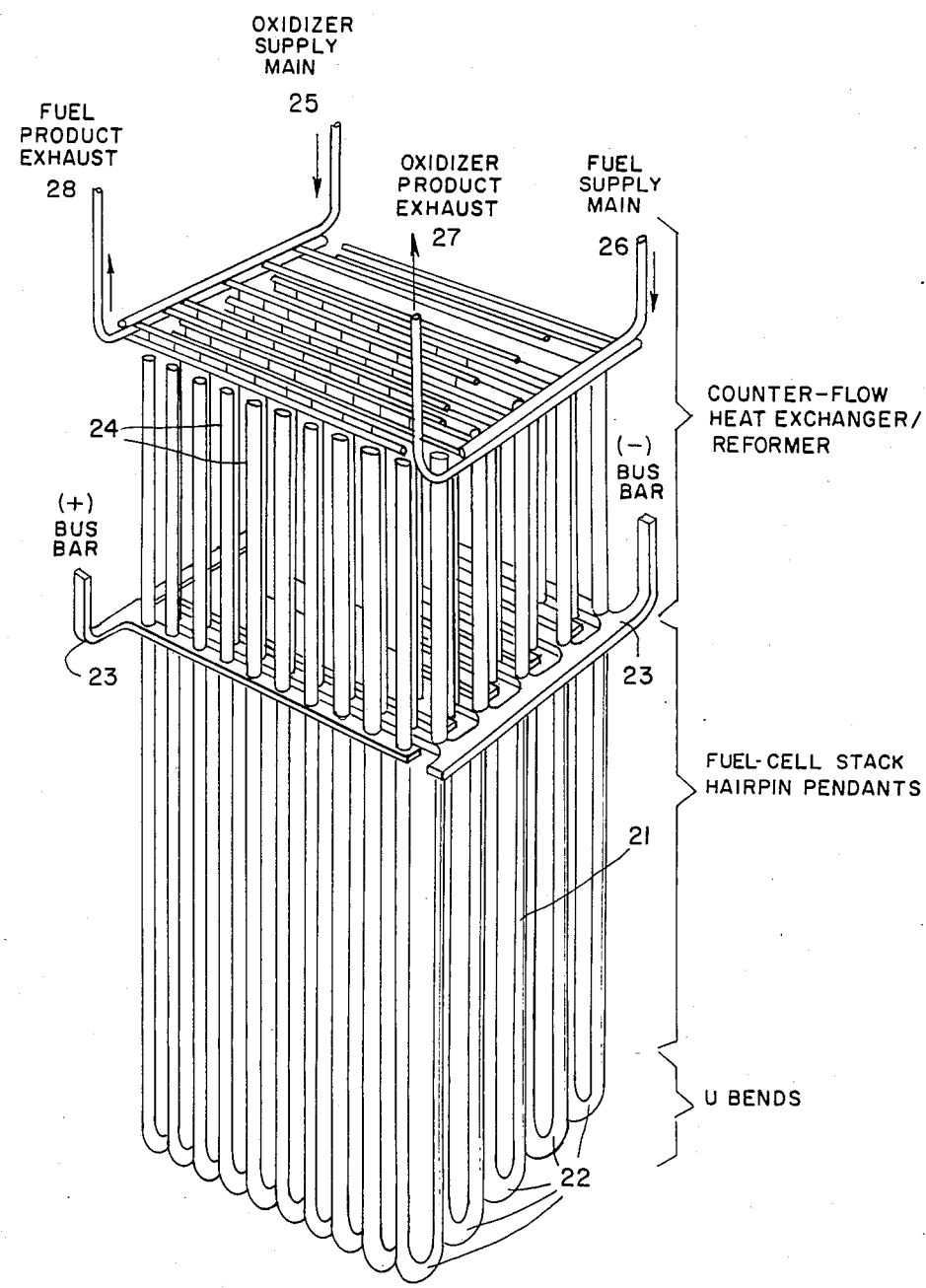
FIG. 7 is an isometric view of an electrochemical energy converter of FIG. 1 including a heat exchanger/reformer.

Referring to FIG. 7, the electrochemical fuel cell stacks can be paired to form hairpin pendants 21 with U bends 22 to achieve better structural rigidity and more convenient one-side terminations for gas manifolding and electric connections. Bus bars 23 are provided to tap electricity from the fuel-cell pendants 21 which are in multiple parallel electrical connections.

Figure 8:
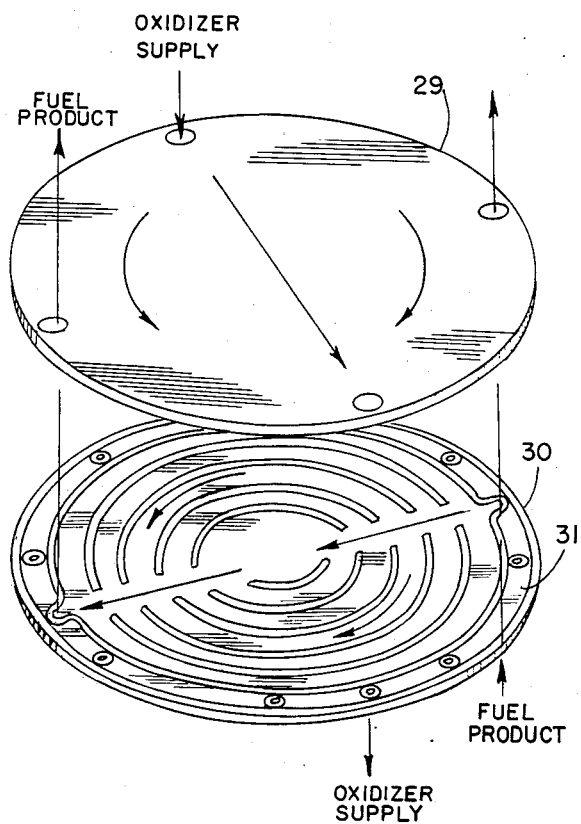
FIG. 8 is an isometric view of the components forming the heat exchanger/reformer section of the converter of FIG. 7.
Figure 4:
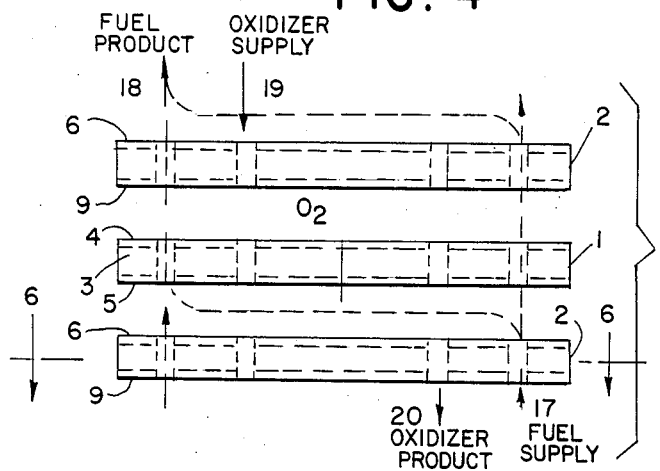
FIG. 4 is a cross-sectional view of an electrochemical stack useful in this invention.
Figure 5:
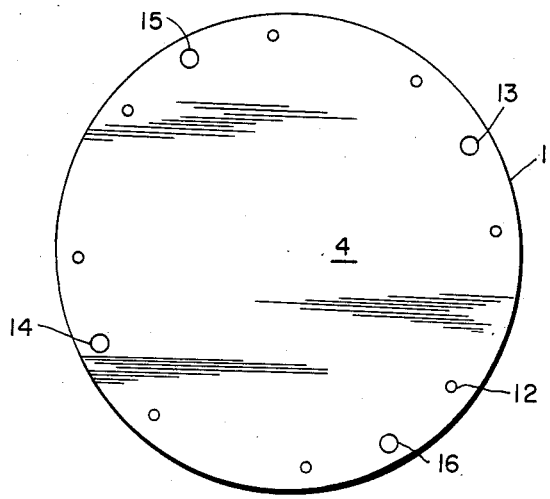
FIG. 5 is a top view of an electrolyte plate used in the electrochemical cell of FIG. 4.
Figure 6:
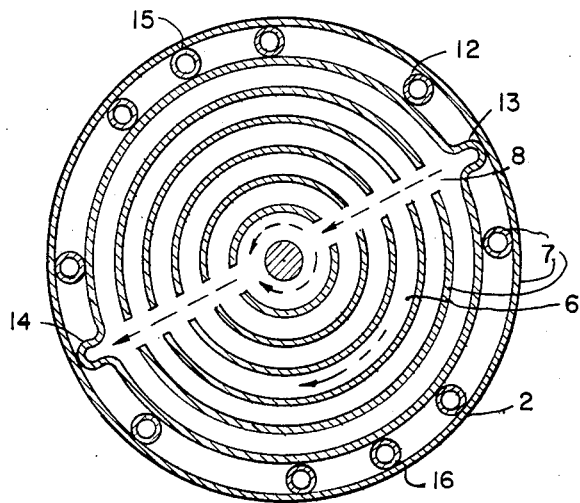
FIG. 6 is a top view of an electrical conductor used in the electrochemical cell of FIG. 4.

The electrochemical fuel-cells operate efficiently at an elevated temperature (700° C. to 1200° C. Heat exchanger/reformer stacks 24 are provided and placed at the top of the electrochemical cell stacks. This section serves as: thermal buffer between hot electrochemical cell stacks 21 and external structures; chemical conditioner which reform the fuel to basic compositions:hydrogen and monoxide, and gas temperature conditioners which heat the incoming reacting gases by the outgoing product gases with a counter flow scheme, as shown in FIG. 8. Heat exchange/reformer stack 24 is constructed from flat plates 29 which are arranged in alternating layers with partition plates 30. Internal passages for feeding and exhausting of gases, and groove networks for distributing gases over flat plates 30 are provided in designs identical to that in the electrochemical stack. Ridges 31 on partition plates 30 are pressed against the flat surfaces of the adjacent flat plates 29 to define gas flow patterns and gas seals. As shown in FIG. 5, the oxidizer supply passes across the top surface of a flat plate 29 while fuel product passes across the bottom surface of flat plate 29 and the top surface of partition plate 30. An indirect heat transfer occurs across the thickness of flat plate 29. The heat transfer efficiency is determined by the dimensions of the grooves in the partition plate 30, thickness of flat plate 29 and its thermal property. At high temperature region (over 700° C.) Inconel or ceramic such as alumina may be required for the construction of the heat exhanger. To achieve gas reforming, catalytic material such as $Al_2O_3/Ni$ may be applied to the flat plate 29 to promote reactions.

Referring to FIG. 7, the oxidizer supply main 25, fuel supply main 26 and product exhaust 27, 28 are located at the low temperature ends of the exchanger/reformer stacks 24. Water-cooled tension rods concealed in bolt holes 12, as described, are used to assemble the fuel cell units together with the heat exchanger/reformer plates. Spring loading is utilized to accommodate thermal expansions in thickness of the plates. Springs (not shown) are located at the low temperature ends of the heatexchanger/reformer stacks 24.

The solid oxide electrolyte plates utilized in the present invention are prepared by a plasma-deposition process. Generally, the process involves the formation of solid oxide electrolyte plates from oxide particles which are first suspended in a working gas such as nitrogen or argon and the suspension then is passed through an arc discharge. The oxide particles are heated by the discharged gas to their molten state and ejected from a nozzle onto a suitable substrate. Roughness and oxidation of surface will cause the particles to adhere to the substrate until a continuous coating of desired thickness is formed. The coating can then be removed from the substrate to become a freestanding plate. The plate is sintered in order to impart desired electrical and mechanical properties to the plate. Thereafter, the fuel electrode and oxidizer electrode are deposited on opposite sides of the plate by flame-deposition which produces coatings of a desired porosity 30–40%. Generally electrolyte plate thickness is between 0.01 and 0.02 inch and the electrode thickness is from 0.003 to 0.005 inch. Care must be taken when depositing the particles on the substrate to avoid thermal gradients which induce cracking of the plate.

Due to the high temperature operation and construction of the fuel cells, and the concealed manifoldings of fuel and oxidizer flows, the direct integration of fuel-cells into the power plant furnace is possible.

Similarly, the gaseous fuel reformer is integrated with heat exchanger and fuel-cells in the power plant furnace. It constitutes the internal reforming of fuel by reacting with separately supplied water or air, to its basic compositions: hydrogen, $H_2$, and carbon monoxide, CO. The reactions are expressed as follows:

$$C_xH_y + x\ H_2O + Q \rightarrow x\ CO + (x+y/2)H_2$$

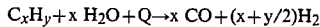

or $$C_xH_y + (x/2)\ O_2 \rightarrow X\ CO + (y/2)\ H_2 + Q'$$

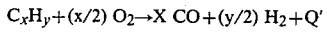

where Q and Q' designate the thermal energy of the reactions. The fuel could be methane, $CH_4$, propane, $C_3H_8$ or other hydrocarbon fuels. The high-temperature internal reforming which occurs in the heat exchanger/reformer 24 eliminates the needs of separate containers or interconnecting pipings.

Overall, the construction of the fuel-cell system is much simplified, the operation of the fuel-cell system is highly efficient. Furthermore, since the fuel is utilized first electrochemically and again thermodynamically, the system efficiency is augmented and pollution is substantially reduced.

A prototype system has been assembled and tested. The setup consists of the fuel cell stack, the heat exchanger/reformer stack, a 1000° C. gas-fired furnace, fuel and air supplies, water supply, an electrical load and instrumentation to measure gas, flow rates, gas pressures, furnace temperature and power output. Propane is selected to operate both the fuel-cell and the furnace. The prototype has successfully demonstrated the following features: (a) the reliability of cell stacks through thermal excursions in the fossil/fueled combustion furnace, (b) the feasibility of direct feed of propane for internal reforming in the high-temperature heat exchanger/reformer stack, and (c) electrical power generation of the fuel cell stack.

What is claimed is:

1. An electrical generating facility having increased efficiency comprising:
   a fossil fired steam power plant including a boiler having a combustion furnace;
   a high temperature fuel-cell in operative relationship with said combustion furnace;
   a fossil-fuel supply:
   means for introducing said fossil fuel to said fuel-cell for generating electricity whereby said fossil fuel becomes partially spent and surplus heat is generated; and
   means for directing said partially spent fossil fuel and said surplus heat from said fuel-cell to said combustion furnace for further combustion.

2. The electrical generating facility of claim 1 wherein said fuel is gas.

3. The electrical generating facility of claim 1 wherein said fuel is coal and said fuel supply comprises a coal gasifier.

4. The electrical generating facility of claim 1 wherein said fuel is oil and said fuel supply is a reactor.

5. The electrical generating facility of claim 2 wherein said fuel supply includes an internal reformer which is integrated with a heat exchanger and the fuel-cell in a high temperature zone.

6. The electrical generating generating facility of claim 5 wherein the reformer produces hydrogen and carbon monoxide from a gaseous fuel.

7. The electrical generating facility of claim 1 wherein said fuel-cell operates at a temperature between about 700° C. and 1200° C.

8. The electrical generating facility of claim 7 wherein the heat generated by the operation of said fuel-cell is directed to said boiler for subsequent steam generation.

9. An electrical generating facility having increased efficiency comprising: a fossil fuel fired, steam power plant including a boiler having at least one high temperature zone therein and including a combustion furnace; a higher temperature fuel-cell mounted within said boiler in said high temperature zone; a fossil fuel supply; and means directing a portion of said fuel supply to said fuel-cell and a portion to said combustion furnace.

* * * * *

UNITED STATES PATENT AND TRADEMARK OFFICE
CERTIFICATE OF CORRECTION

PATENT NO. : 4,644,751
DATED : February 24, 1987
INVENTOR(S) : Michael S. Hsu

It is certified that error appears in the above-indentified patent and that said Letters Patent is hereby corrected as shown below:

Column 1, line 4, add the following:

-- This invention was made with government support under Contract No. F19628-90-C-0002 by the Air Force. The government has certain rights in the invention --.

Signed and Sealed this

Sixteenth Day of May, 1995

*Attest:*

BRUCE LEHMAN

*Attesting Officer*     *Commissioner of Patents and Trademarks*